United States Patent
Oks et al.

(10) Patent No.: US 10,956,193 B2
(45) Date of Patent: Mar. 23, 2021

(54) HYPERVISOR VIRTUAL PROCESSOR EXECUTION WITH EXTRA-HYPERVISOR SCHEDULING

(71) Applicant: Microsoft Technology Licensing, LLC, Redmond, WA (US)

(72) Inventors: Artem Oks, Kirkland, WA (US); David Hepkin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 15/476,925

(22) Filed: Mar. 31, 2017

(65) Prior Publication Data
US 2018/0285135 A1     Oct. 4, 2018

(51) Int. Cl.
G06F 9/455    (2018.01)
G06F 9/48     (2006.01)
G06F 9/54     (2006.01)

(52) U.S. Cl.
CPC .......... *G06F 9/45558* (2013.01); *G06F 9/485* (2013.01); *G06F 9/4843* (2013.01); *G06F 9/4881* (2013.01); *G06F 9/545* (2013.01); G06F 2009/45575 (2013.01); G06F 2009/45583 (2013.01); G06F 2009/45587 (2013.01)

(58) Field of Classification Search
None
See application file for complete search history.

(56) References Cited

U.S. PATENT DOCUMENTS

| 6,269,391 | B1 * | 7/2001 | Gillespie | G06F 9/4881 718/100 |
| 7,765,428 | B2 * | 7/2010 | Armstrong | G06F 9/5066 714/10 |
| 7,797,512 | B1 * | 9/2010 | Cheng | G06F 9/455 712/10 |
| 8,219,988 | B2 * | 7/2012 | Armstrong | G06F 12/1475 718/1 |

(Continued)

OTHER PUBLICATIONS

"The CPU Scheduler in VMware vSphere® 5.1", In Technical Whitepaper, 2013, pp. 1-26.

(Continued)

*Primary Examiner* — Abu Zar Ghaffari
(74) *Attorney, Agent, or Firm* — Watson Patents, PLC; Vladan M. Vasiljevic

(57) ABSTRACT

Moving scheduling of processor time for virtual processors (VPs) out of a virtualization hypervisor. A host operating system schedules VP (virtual processor) processor time. The host operating system creates VP backing threads, one for each VP of each virtual machine. There is a one-to-one mapping between each VP thread in the host operating system and each VP in the hypervisor. When a VP thread is dispatched for a slice of processor time, the host operating system calls into the hypervisor to have the hypervisor start executing the VP, and the hypervisor may perform a processor context switch for the VP. Of note is the security separation between VP scheduling and VP context switching. The hypervisor manages VP context switching in kernel mode while VP scheduling is performed in user mode. There is a security/interface boundary between the unit that schedules VP processor time and the hypervisor.

20 Claims, 8 Drawing Sheets

(56) References Cited

U.S. PATENT DOCUMENTS

| | | | |
|---|---|---|---|
| 8,225,315 B1* | 7/2012 | Cheng | G06F 9/455 718/1 |
| 8,464,258 B2* | 6/2013 | Shinohara | G06F 9/45533 718/1 |
| 8,539,499 B1 | 9/2013 | Tovpeko et al. | |
| 8,543,790 B2 | 9/2013 | Chen et al. | |
| 8,695,007 B2* | 4/2014 | Wada | G06F 9/45533 718/104 |
| 9,304,803 B2 | 4/2016 | Nelson et al. | |
| 9,417,927 B2* | 8/2016 | Abraham | G06F 9/5077 |
| 9,778,943 B2* | 10/2017 | Tsirkin | G06F 9/485 |
| 10,176,095 B2* | 1/2019 | Ferguson | G06F 12/08 |
| 10,191,861 B1* | 1/2019 | Steinberg | G06F 12/1491 |
| 10,430,226 B2* | 10/2019 | Zheng | G06F 9/45558 |
| 10,447,728 B1* | 10/2019 | Steinberg | G06F 9/45558 |
| 10,831,556 B2* | 11/2020 | Du | G06F 9/5077 |
| 2006/0200663 A1* | 9/2006 | Thornton | G06F 21/73 713/164 |
| 2006/0259818 A1* | 11/2006 | Howell | G06F 11/1484 714/21 |
| 2008/0184227 A1* | 7/2008 | Matsumoto | G06F 9/5077 718/1 |
| 2009/0037911 A1* | 2/2009 | Ahuja | G06F 9/5044 718/100 |
| 2009/0106754 A1* | 4/2009 | Liu | G06F 9/4812 718/1 |
| 2010/0125843 A1* | 5/2010 | Saito | G06F 9/45558 718/1 |
| 2011/0246171 A1* | 10/2011 | Cleeton | G06F 9/45558 703/25 |
| 2012/0096206 A1* | 4/2012 | Talamacki | G06F 9/45558 710/263 |
| 2012/0227042 A1* | 9/2012 | Zedlewski | G06F 9/5027 718/1 |
| 2012/0291027 A1* | 11/2012 | Chiang | G06F 9/4425 718/1 |
| 2013/0185720 A1* | 7/2013 | Tuch | G06F 12/023 718/1 |
| 2014/0137104 A1 | 5/2014 | Nelson et al. | |
| 2014/0149633 A1 | 5/2014 | Tsirkin et al. | |
| 2014/0282507 A1* | 9/2014 | Plondke | G06F 9/45545 718/1 |
| 2014/0304414 A1* | 10/2014 | Yengalasetti | H04L 67/1036 709/226 |
| 2014/0331222 A1* | 11/2014 | Zheng | G06F 9/45558 718/1 |
| 2015/0007170 A1 | 1/2015 | Tsirkin et al. | |
| 2015/0033228 A1* | 1/2015 | Lee | G06F 9/45533 718/1 |
| 2015/0199532 A1* | 7/2015 | Ismael | G06F 21/552 726/30 |
| 2015/0334126 A1* | 11/2015 | Mooring | G06F 9/45558 726/1 |
| 2015/0370592 A1* | 12/2015 | Tuch | G06F 9/45558 718/1 |
| 2016/0147549 A1 | 5/2016 | Sivak et al. | |
| 2016/0162336 A1* | 6/2016 | Zheng | H04L 47/56 718/104 |
| 2016/0179560 A1* | 6/2016 | Ganguli | G06F 11/3442 718/1 |
| 2016/0253196 A1* | 9/2016 | van Riel | G06F 9/45558 718/1 |
| 2016/0371110 A1* | 12/2016 | Radhakrishnan | G06F 9/45558 |
| 2016/0371118 A1* | 12/2016 | Dhanraj | G06F 9/5077 |
| 2016/0371127 A1 | 12/2016 | Antony et al. | |
| 2017/0244557 A1* | 8/2017 | Riel | G06F 9/45558 |
| 2018/0060103 A1* | 3/2018 | Tsirkin | G06F 9/45545 |
| 2018/0101486 A1* | 4/2018 | Lu | G06F 9/45558 |
| 2018/0349143 A1* | 12/2018 | Park | G06F 9/4893 |

OTHER PUBLICATIONS

Miao, et al., "FlexCore: Dynamic Virtual Machine Scheduling Using VCPU Ballooning", In Tsinghua Science and Technology, vol. 20, Issue 1, Feb. 12, 2015, pp. 7-16.

"International Search Report and Written Opinion Issued in PCT Application No. PCT/US18/023674", dated Jul. 18, 2018, 13 Pages.

* cited by examiner

HYPERVISOR VIRTUAL PROCESSOR EXECUTION WITH EXTRA-HYPERVISOR SCHEDULING

BACKGROUND

Among the many forms of computer virtualization, machine or system virtualization has become common due to many known advantages. System virtualization involves abstracting the hardware resources of a computer and presenting the computer as virtual machines. A layer of software referred to as a hypervisor or virtual machine monitor (VMM) runs directly on the hardware of a computer. The hypervisor manages access to the hardware of the computer by virtual machines (VMs), which are also known as partitions, domains, or guests. Each VM is a software environment or construct capable of hosting its own guest operating system. The hypervisor manages sharing of the computer's hardware, in particular processing hardware, by the VMs. The presence of a layer of software—the hypervisor— between the guest operating system and the computer hardware is mostly transparent to the guest operating system.

One type of hypervisor is the type I hypervisor, also referred to as a stand-alone, native, bare metal, or embedded hypervisor. Examples of type I hypervisors are Microsoft Hyper-V™ from Microsoft Corp., KVM™ (Kernel-based Virtual Machine) from Red Hat Corp., VMware ESXi™ from VMware Inc., and Xen™, which is available from various sources. Traditionally, in virtualization architectures that use a type I hypervisor ("hypervisor", hereafter), the hypervisor is responsible for managing the virtualization of processors. Specifically, the hypervisor applies resource policies to virtual processors and schedules execution of virtual processors on physical processors. A hypervisor is usually accompanied by a privileged VM that hosts a special guest operating system that handles other virtualization-related tasks that need not reside in the hypervisor. This special operating system will be referred to as the host operating system or the host kernel. The hypervisor and host operating system together will be referred to as a virtualization layer. The virtualization tasks handled by the host operating system varies among hypervisor implementations. Some may handle aspects of device emulation/virtualization, I/O virtualization, inter-VM communication, etc. Some may provide a user interface to enable a user to configure the virtualization layer, VMs, etc. The host operating system may also have administrative tools or other software that is not necessary for virtualization.

Although which virtualization responsibilities are handled by the hypervisor and which are handled by the host operating system can vary, all type I hypervisors (including kernel-based hypervisors such as the KVM hypervisor) handle processor virtualization, including scheduling of processor time for virtual processors, managing the kernel objects (e.g. threads or processes) that back the virtual processors, etc. This approach has shortcomings.

One shortcoming of having the hypervisor handle processor scheduling is scheduler redundancy. Operating systems that are employed as VM guests or as host operating systems are usually designed to be capable of running directly on hardware. They have their own kernel scheduler designed for scheduling their own threads on processors (or on virtual processors, as the case may be). These operating systems' schedulers are usually heavily engineered for resource control and for supporting advanced power management policies. To date, hypervisors have also had their own scheduler implementation that is independent of the scheduler in the host/operating systems. Because a hypervisor has its own scheduler, some of the sophisticated scheduler logic often found in host/guest operating systems must either be omitted or else duplicated in the hypervisor scheduler. For example, supposing a host/guest kernel's scheduler is enhanced with a new feature to make its scheduling more power efficient, if the benefit is to be had on a computer where the host kernel executes in a VM on top of a hypervisor (which actually controls scheduling), this new feature must be duplicated in the hypervisor's scheduler for the host computer to obtain the same benefit.

The stacked layers of scheduling also make it difficult to realize certain performance and management improvements. Regarding performance, it has been observed that the nature of VM workloads often vary. For instance, some VMs might be I/O bound, others might be processor bound. A hypervisor scheduler cannot self-adjust to suit VM workload conditions because those conditions may not be visible to the hypervisor. For example, if some I/O virtualization occurs at the host operating system, actionable information about I/O conditions may not be available in the hypervisor. Regarding management, when the hypervisor handles processor scheduling, CPU resource reporting for virtual machines is not naturally accounted for in the host operating system. Because the host operating system does not have direct visibility to how a VM's virtual processors are being scheduled, the host operating system cannot determine how physical CPU resources are actually being consumed. CPU resource reporting tools in the host operating system may report an incorrect view of CPU resource consumption, since such tools are in fact reporting CPU resource consumption of the host operating system (and not the virtual machines). Accordingly, system tools must be retooled if system-wide CPU usage is to be monitored accurately in a virtualized environment. Moreover, hypervisor-based scheduling can make execution tracing and analysis difficult because of the need to correlate between events from two schedulers.

Implementing scheduling in the hypervisor also carries security risks. Because each VM's execution is controlled in the same security domain (the hypervisor), there is a risk that a hypervisor breach of one VM could lead to compromise of the hypervisor and thus compromise of the other VMs.

Some of the problems discussed above may be solved by scheduling virtual processors outside of the hypervisor, as described below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to moving scheduling of processor time for virtual processors (VPs) out of a virtualization hypervisor. In one embodiment, a host operating system schedules VP processor time. The host operating system creates VP backing threads, one for each VP of each VM. There is a one-to-one mapping between each VP thread in the host operating system and each VP in the hypervisor. When a VP thread is dispatched for a slice of processor time, the host operating system calls into the hypervisor to have the hypervisor start executing the VP, and the hypervisor may perform a processor context switch for the VP. Of note is the security separation between VP scheduling and VP context switching. In one embodiment, the hypervisor manages VP contexts and controls VP context switching while VP scheduling is performed in kernel mode in the context of the host operating system's VM. There is a security/interface boundary between the unit that schedules VP processor time and the hypervisor.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments described below relate to shifting scheduling of processor time for virtual processors (VPs) from a hypervisor to a host operating system. In one embodiment, the host operating system schedules a VP by making a blocking call into the hypervisor to run a VP. The host operating system creates VP threads, one for each VP of each VM. There is a one-to-one mapping between each VP thread in the host operating system and each VP in the hypervisor. When a VP thread is dispatched for a slice of processor time, the host operating system calls into the hypervisor to have the hypervisor start executing the VP. When an interrupt occurs, execution of the VP stops, and the hypervisor returns control back to the host operating system. This allows the host operating system to then schedule a different thread, which can be a VP thread or just a regular software thread that has no relation to a virtual processor.

Figure 1:
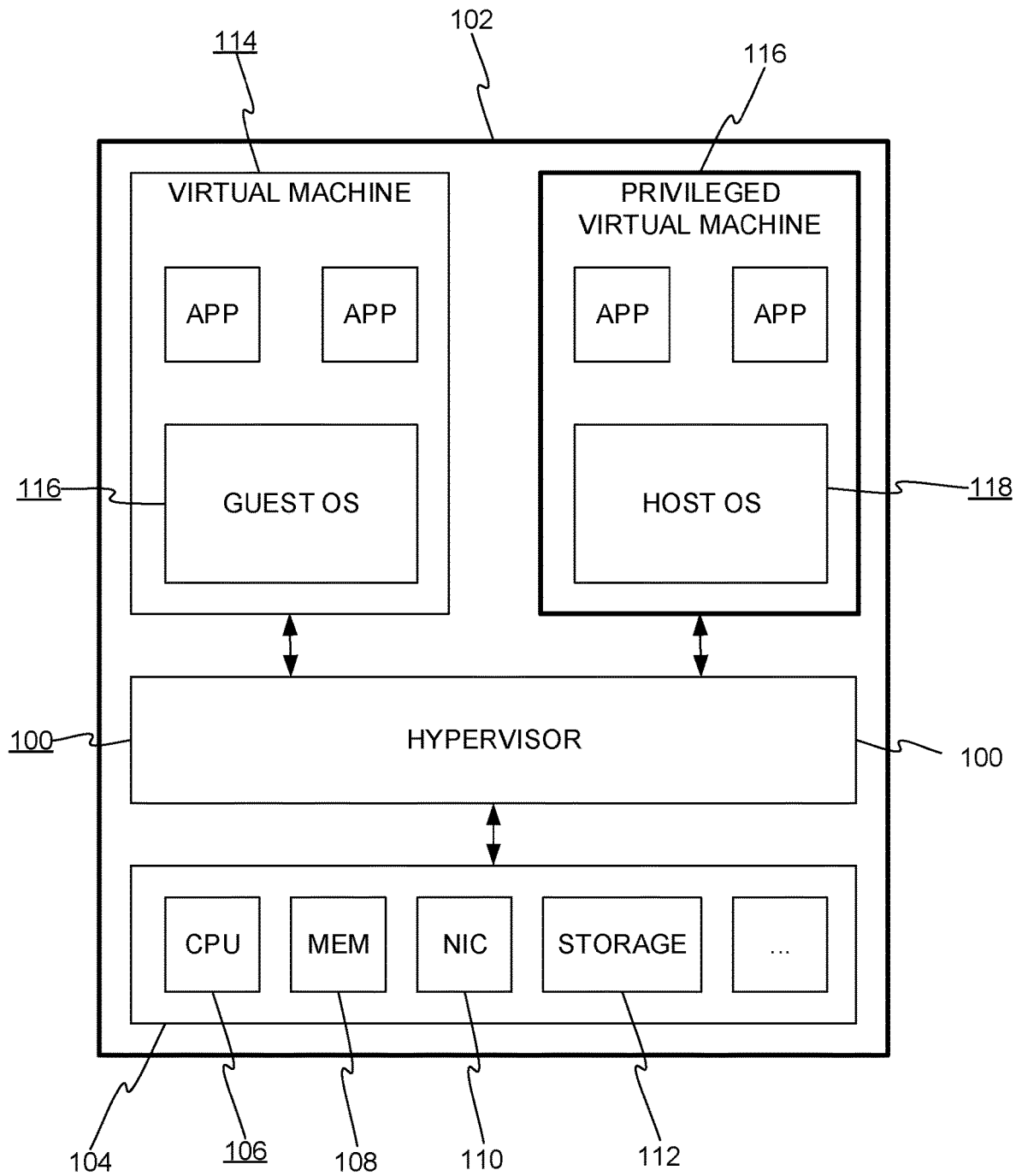
FIG. 1 shows an example virtualization environment that includes a known type of a system virtualization hypervisor.

FIG. 1 shows an example virtualization environment that includes a known type of hypervisor 100. A computer 102 has hardware 104, including a central processing unit (CPU) 106, memory 108, a network interface 110, non-volatile storage 112, and other components not shown, such as a bus, a display and/or display adapter, etc. The hypervisor 100 manages and facilitates execution of virtual machines (VMs) 114, 116. Each virtual machine 114, 116 typically has virtualized devices including a virtual disk within which a guest/host operating system 116, 118 is stored. Machine or system virtualization is provided by the hypervisor 100 cooperating with a host operating system 118 that executes in a privileged VM 116. The tasks of virtualization may be distributed among the hypervisor 100 and the host operating system 118 in a number of ways, as discussed in the Background. In some cases, the host operating system 118 might consist only of minimal virtualization elements such as tools and user interfaces for managing the hypervisor 100. In other cases, the host operating system 118 might include one or more of: device virtualization management, inter-VM communication facilities, running device drivers, starting or stopping other VMs. In short, the host operating system 118 can potentially handle any virtualization tasks outside core functions of a hypervisor such as CPU and memory sharing. Despite a wide range of virtualization layer designs, as discussed next, all previous virtualization systems have implemented all aspects of processor scheduling in the hypervisor 100.

Figure 2:
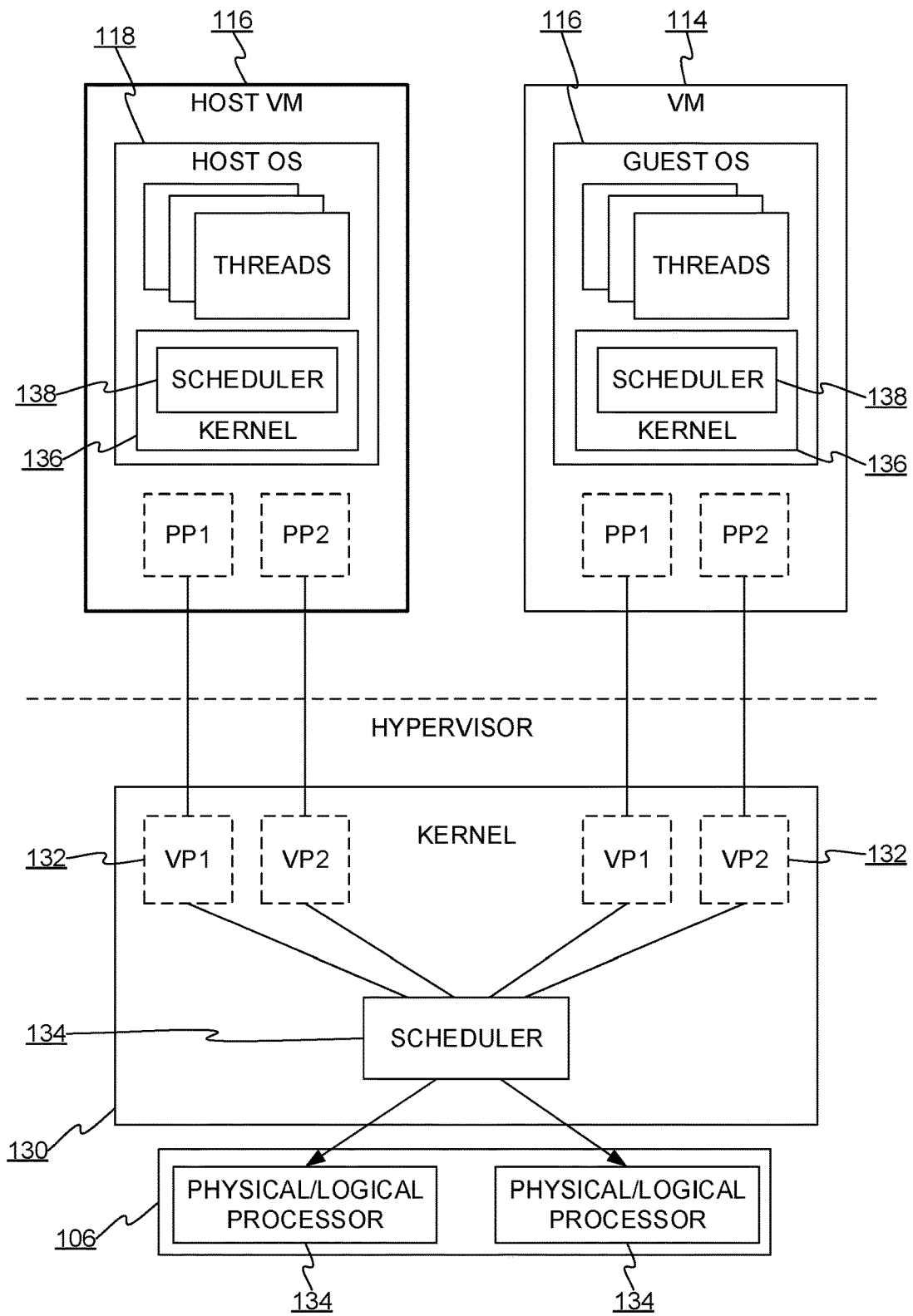
FIG. 2 shows details of hypervisor-based processor scheduling.

FIG. 2 shows details of hypervisor-based processor scheduling. All previous virtualization hypervisors have been kernels 130 that implement processor sharing completely within the hypervisor. With this kernel-based processor sharing approach, the hypervisor kernel 130 typically backs virtual processors (VPs) 132 with kernel-level execution units such as processes and/or threads. The hypervisor kernel 130 has a scheduler 134 that implements perhaps complex scheduling algorithms to determine which VPs are to execute on which physical processors (PPs) 134, and when. Often, the scheduler 134 is the same type of scheduler ordinary operating system kernels use for time-sharing a processor among processes or threads. The hypervisor kernel 130 has also been responsible for the mechanics of time-slicing, for instance performing PP context switches. This kernel-based approach has shortcomings. As shown in FIG. 2, there is a redundancy issue; the kernels 136 of guest and host operating systems have their own schedulers 138. In addition, implementing scheduling in the hypervisor creates security risks because if the scheduling code is compromised any VM could potentially access the data of any other VM. Other problems with hypervisor-based scheduling are discussed in the Background. Regarding terminology, as used herein "physical processor" refers to both physical cores of a CPU as well as logical cores of CPUs that implement hyperthreading; from software's perspective, logical and physical processors/cores are mostly indistinguishable.

Figure 3:
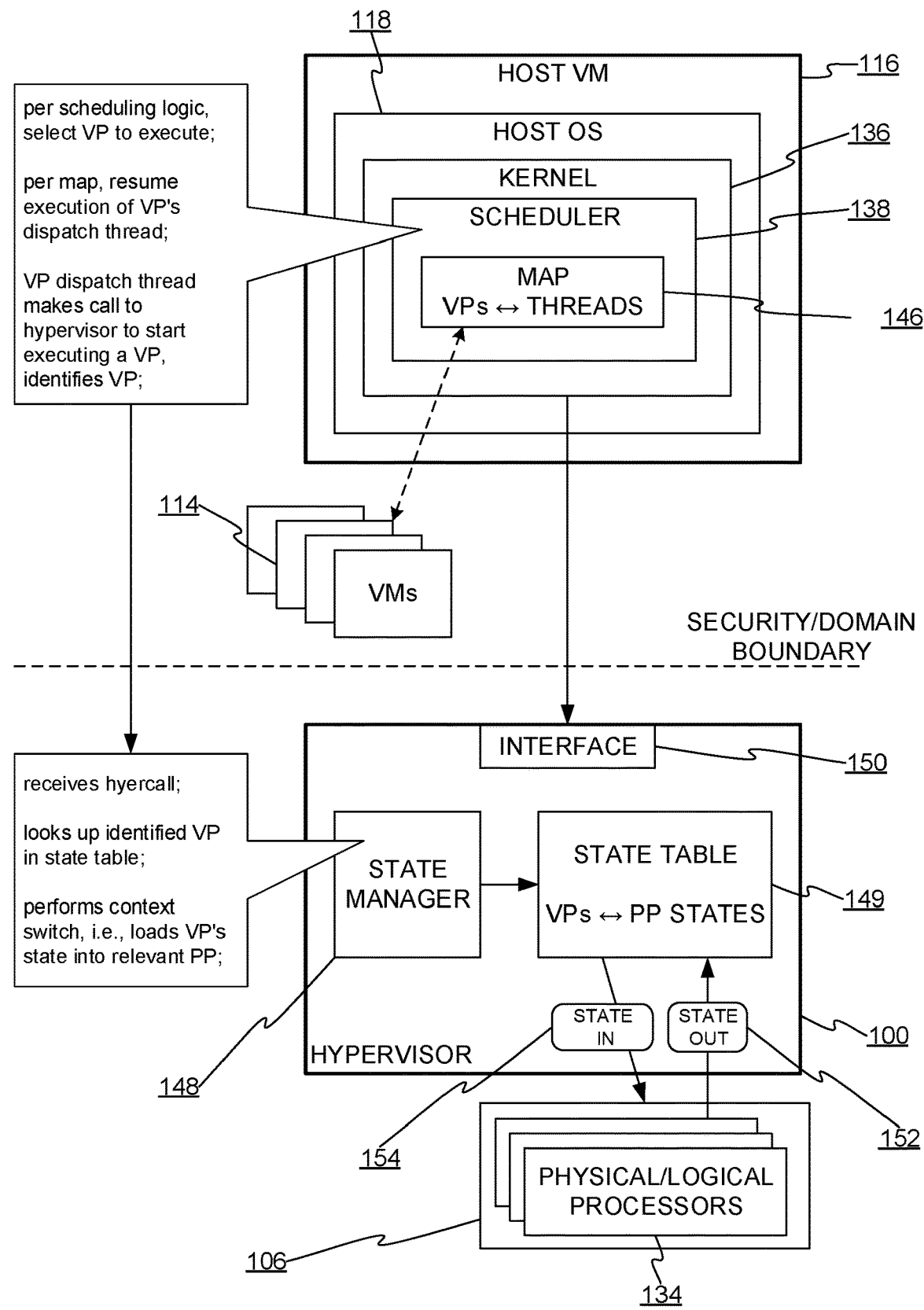
FIG. 3 shows a virtualization architecture that implements processor scheduling for VMs in the host operating system.

FIG. 3 shows a virtualization architecture that implements processor scheduling for VMs in the host operating system 118. This new architecture shifts processor scheduling for VMs out of the hypervisor 100 and into the host operating system 118. Conceptually, the host operating system's scheduler 138 makes decisions about which VPs will execute and when. The host operating system's scheduler 138 tells the hypervisor 100 which VP to execute. More specifically, the host operating system maintains a map 146 indicating which threads (or other execution backing units) correspond to which VPs (for all VMs). The hypervisor has a state manager 148 that manages processor states of the VPs in a state table 149. The state manager 148 uses the state table 149 to perform context switches to implement the processor-sharing instructions (hypercalls) of the host operating system 118. The host kernel 136 instantiates and manages the kernel-level execution units/objects that back the VPs. For discussion, the backing objects will be described as threads, although processes or other units of execution can be used.

When the host operating system scheduler 138 determines that a VM is to be started, the host operating system creates VP backing threads for the respective VPs of the starting VM. Each VP of each VM has a VP backing thread. Each VP backing thread runs a dispatch loop until, for whatever reason, the corresponding VP is stopped. The scheduler 138 in the host VM schedules VP backing threads as regular threads subject to additional VM/VP-specific scheduling policies and possibly enlightenments (information provided by guests). The hypervisor 100 is configured with an interface 150 that exposes one or more hypercalls allowing the host operating system to make calls into the hypervisor.

To elaborate, the VP backing/dispatch threads are thread objects in the host operating system that function like any other thread object. The host operating system scheduler 138 schedules all of its threads including the VP backing threads. In one embodiment, each VP backing thread knows the identifier of the corresponding VP, and when a VP backing thread is scheduled to run, it calls into the hypervisor to dispatch the VP on the current processor. Each VP backing thread runs a dispatch loop. When a VP backing thread receives time to run, it makes a hypercall intercepted by the hypervisor that instructs the hypervisor to "run this VP". The host operating system might need to tell the hypervisor, through hypercall parameters, which VP and/or VM to start running. The hypervisor only needs to know which VP (or VM) to run. The processor state for the VP need not be visible to the host VM and preferably the host VM is not permitted or able to access same directly.

From the perspective of the host VM, a VP is just another thread and execution of the VP by the hypervisor is transparent. When a VP backing thread is scheduled and starts executing, it is running on a PP (the one currently executing a VP of the host VM when the VP backing thread is started). The VP backing thread executes and invokes the hypercall to switch into the hypervisor (a privileged hypervisor operation). When entering hypervisor mode, the VP backing thread is initially still executing on the same PP with the host VM's context. As noted, the hypervisor maintains processor states of all VPs in the state table 149 and knows which VP the VP backing thread corresponds to. After saving the current PP state 152 (corresponding to the host VM's VP), the hypervisor swaps into the current PP the previously-stored processor state 154 of the VP that issued the hypercall, effectively beginning execution of the relevant VP. At this point, the VP is executing guest code on the PP. The hypervisor lets the VP run until either the VP blocks voluntarily, the VP generates an intercept for the root, or an interrupt has arrived for the root VP. On any of these three events the hypervisor context-switches back to the host's VP and the latter completes the hypercall and returns to the host VM. In sum, the hypervisor merely executes the VPs it is told to execute, and the host operating system controls the scheduling of VP execution.

Because the hypervisor is informed, through a hypercall parameter, which VP is executing, the hypervisor knows which processor state to swap in from the state table 149. Note that in one embodiment the host operating system sees each root/host VP as a logical/physical processor and does not need to schedule its own processing time in the same way that it schedules other VM processing time. When a VP is executing and there is an interrupt or other event that needs to be taken care of by host operating system, the hypervisor just switches context to the corresponding root/host VP (there is a one-to-one mapping between each root/host VP and PP). When the root VP enters (returns to) the host VM, it is running in the context of whatever thread made the hypercall, and the host kernel decides what to do next.

To summarize, there is no scheduler in the hypervisor. There may be one stack per PP in the hypervisor. The host VM owns all PP scheduling and idling decisions. Each VP has VP backing thread or other unit of execution. The host VM schedules the VP backing threads. Each VP backing thread: runs a dispatch loop, makes a hypercall to switch from the host VP to the corresponding target VP (e.g., VP context switch hypercall), and optionally provides host targeted work requests on return from the VP context switch hypercall.

Figure 4:
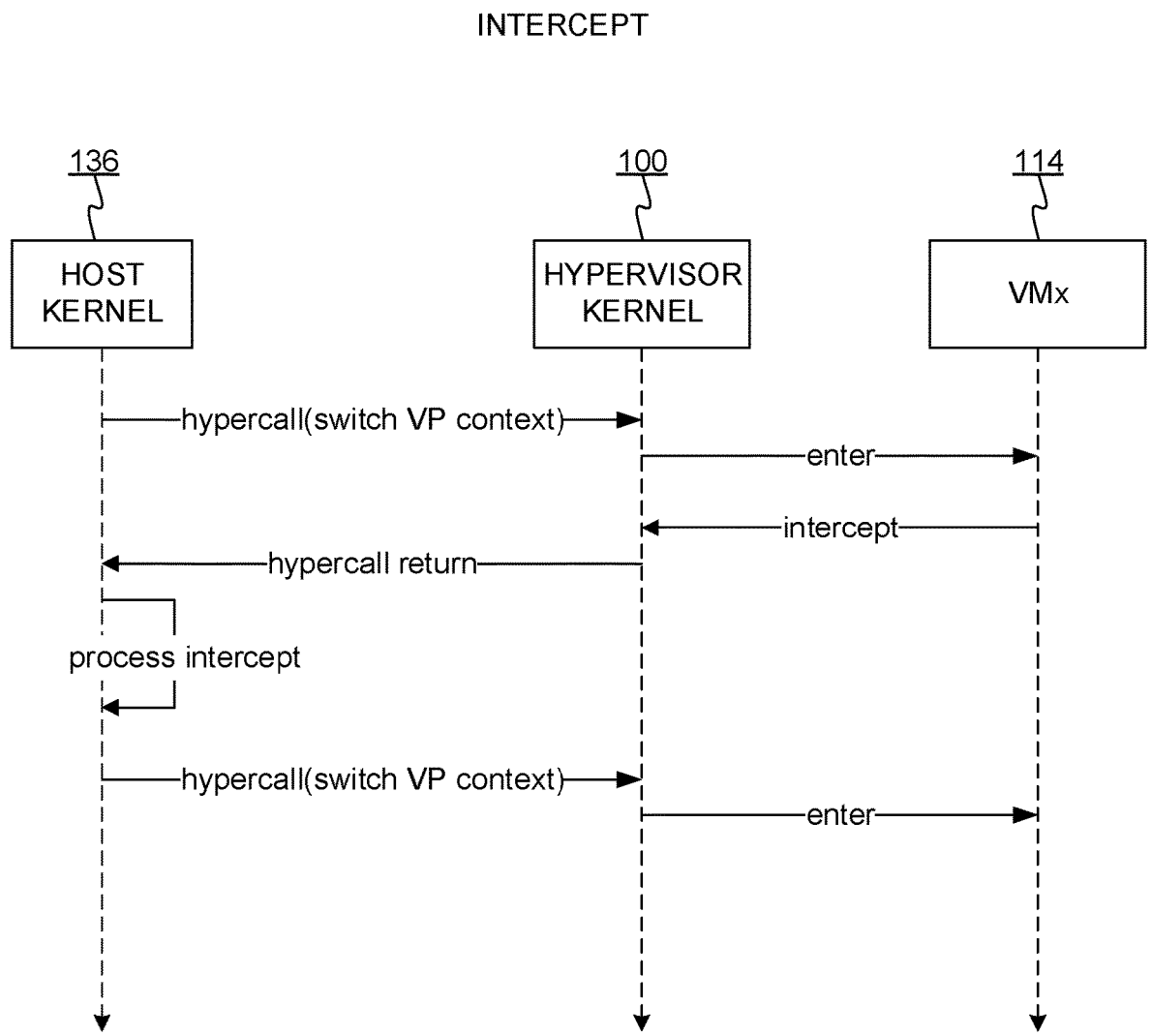
FIG. 4 shows a control flow for handling intercepts.

FIG. 4 shows a control flow for handling intercepts. An intercept is a return from a VP context switch hypercall. When the host kernel 136 decides to schedule a VP, the host kernel 136 issues a hypercall with an identifier of the VP. The hypervisor 100 begins executing the thread with the context of the VP for the relevant VM 114. When the VM 114 triggers an intercept, the hypervisor kernel returns control to the host kernel 136 with a return from the initial hypercall. The host kernel 136 then processes the intercept, issues another hypercall, and the VM/VP necessary for the intercept.

Figure 5:
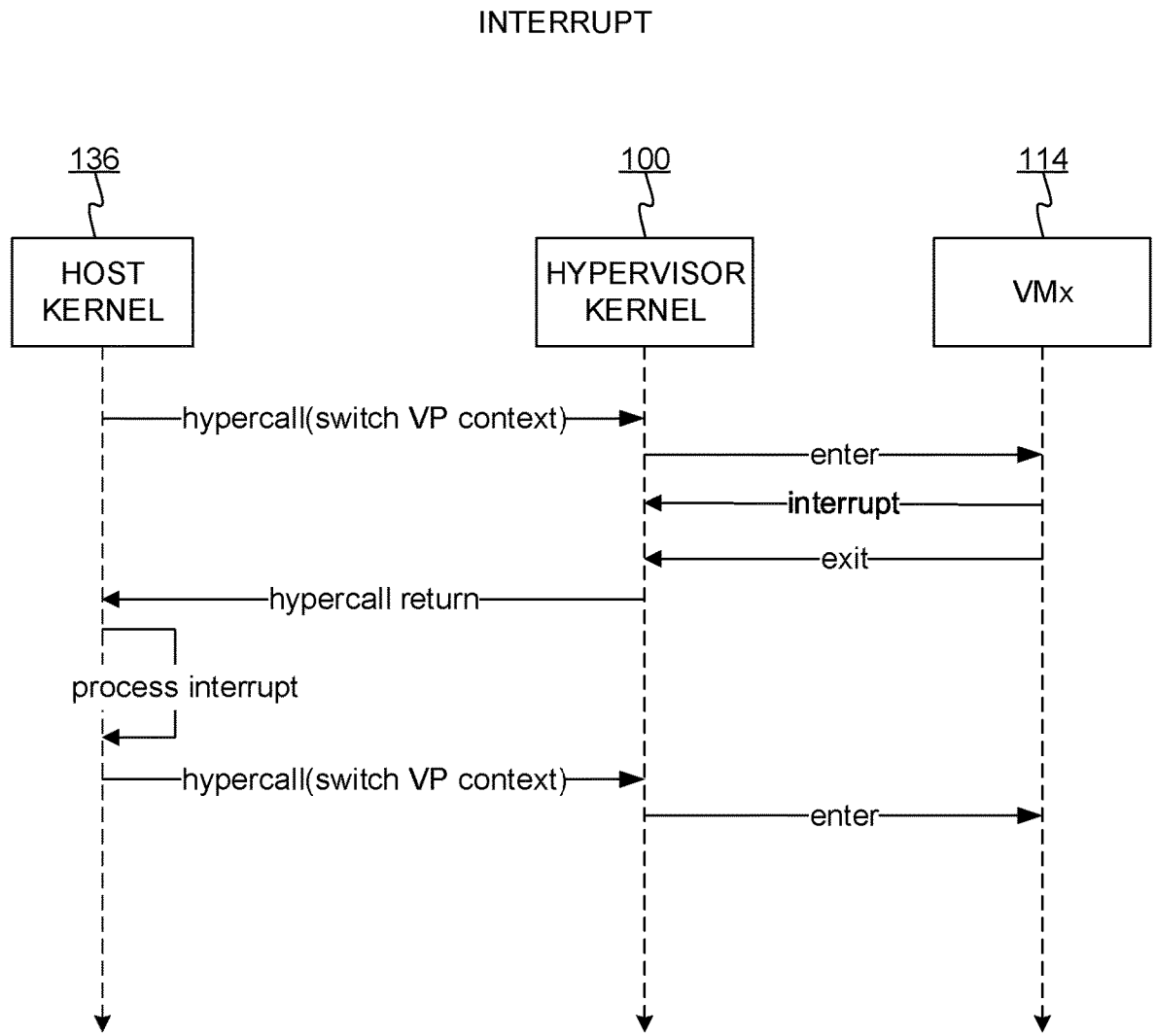
FIG. 5 shows a flow for handling interrupts.

FIG. 5 shows a flow for handling an interrupt. After the hypercall and context switch to the relevant VP, an interrupt occurs. In response, the VP exits, control returns to the hypervisor, and the host kernel processes the interrupt, eventually returning control to the VP through another hypercall.

Figure 6:
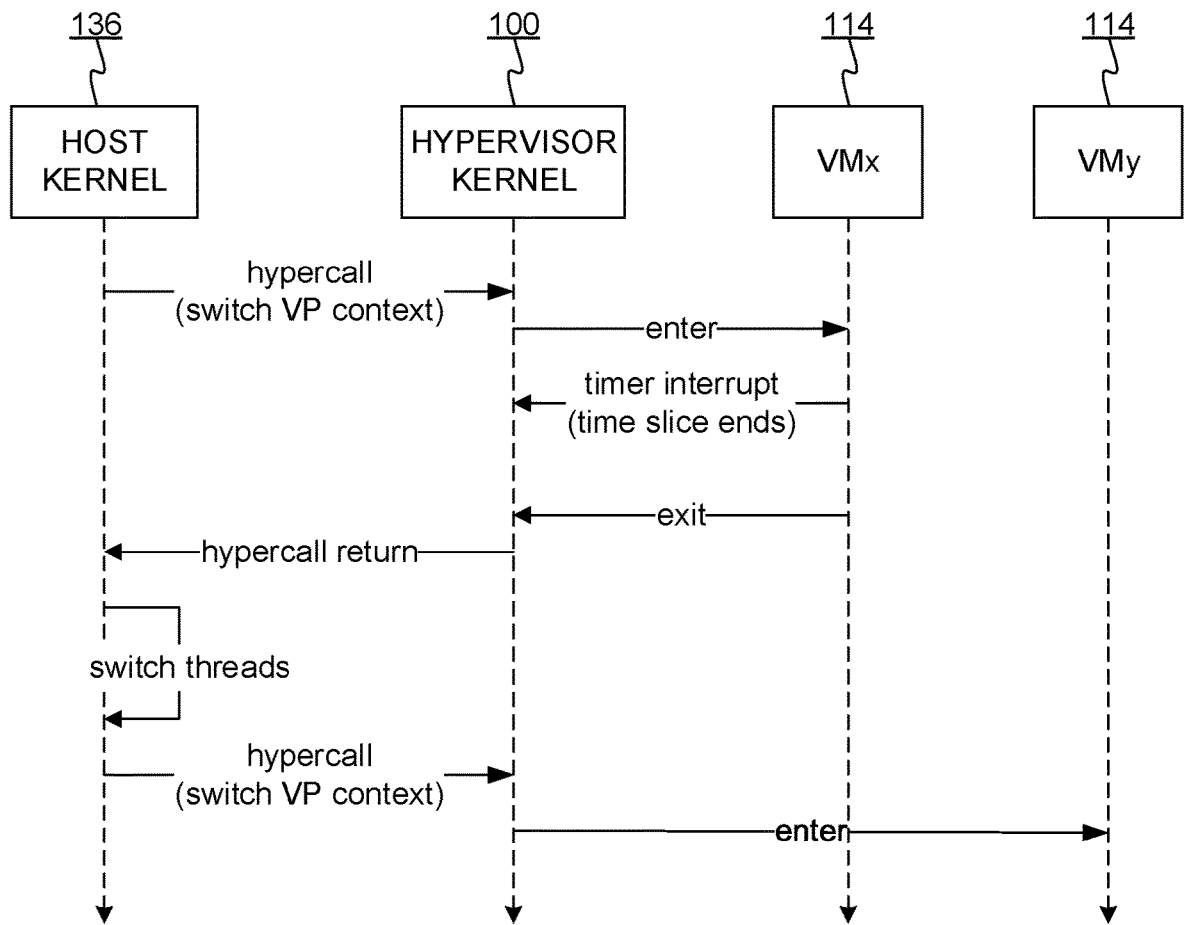
FIG. 6 shows a control flow for handling context switches.

FIG. 6 shows a control flow for handling a context switch. After an initial hypercall and while a first VM's VP is executing, a timed scheduling interrupt is generated and the VP of the first VM exits. The hypercall returns to the host kernel, which switches threads to the next scheduled thread and issues a hypercall for the VP of the new thread.

Figure 7:
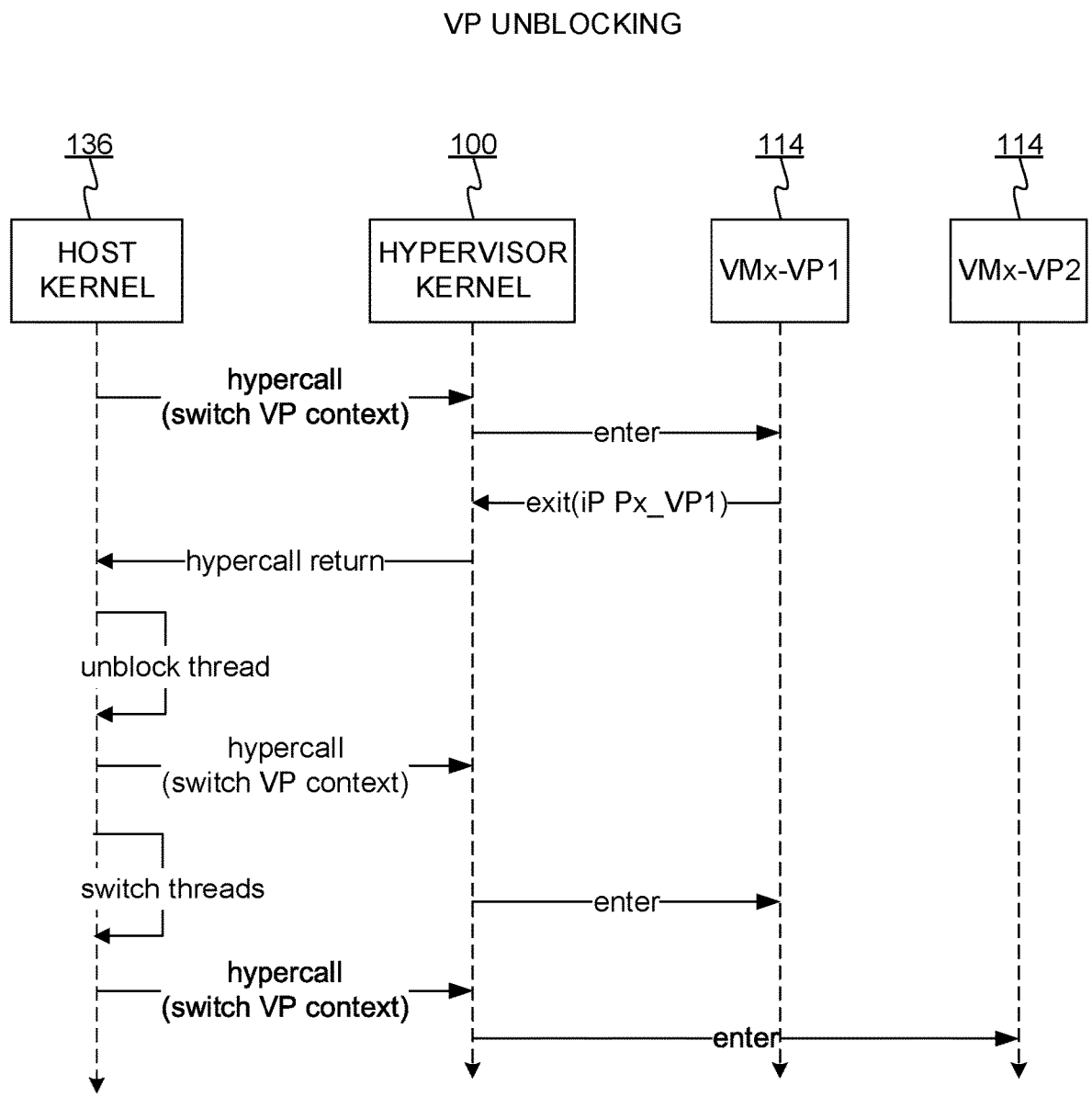
FIG. 7 shows a control flow for unblocking a VP.

FIG. 7 shows how a control flow for unblocking a VP. As can be seen, unblocking of a VP may require an extra trip to the host if there are not any optimizations. The control flow operates as follows. A VM's first VP is running while the VM's second VP is idle. At some point, the first VP requests to send an IPI to the second VP. As the result, the first VP exits into the hypervisor and sets a pending virtual interrupt for the second VP. The hypervisor switches to the host VP to deliver the wakeup (unblock) signal to the VP backing thread of the second VP. The host VP returns, signals the requested VP backing thread, and makes another hypercall to dispatch and continue running the VM's first VP. At some time shortly thereafter, the host operating system schedules to run a VP backing thread on another host VP. The latter calls into the hypervisor and the VM's second VP starts executing the guest code.

Although a host operating system is convenient, other techniques for separating VP scheduling from the hypervisor may be used. In one embodiment, the privileged extra-hypervisor functionality of the host operating system need not be executed in a VM or container. Any module that interfaces with the hypervisor can perform the VP scheduling. For example, a module with an execution context permanently running on a PP can avoid context switches between host VPs and hypervisor idle threads. This may also reduce code path lengths and latencies for entering leaving idle states. In addition, as mentioned above, enlightenments may be implemented to allow guest VMs to provide the host VM with information relevant to scheduling, such as workload profiles, scheduling priorities, I/O statistics, etc.

Removing VP scheduling from the hypervisor can provide other advantages. Newer CPUs may have different types of cores on the same chip (so-called "big.LITTLE" designs). This type of CPU can be leveraged by exposing the CPU topology to guest VMs (e.g., big VPs and LITTLE VPs). The kernel scheduler in a big.LITTLE guest VM makes its own scheduling decisions. The host operating system is aware of which VP backing threads are big and which ones are LITTLE. The host operating system's scheduler decides how to schedule big and LITTLE VP backing threads according to the host operating system's power management policies and constraints.

Removing VP scheduling from the hypervisor can have other advantages. The host operating system may have tools for analyzing system performance. If host threads are used to back VPs, tools for analyzing thread performance can provide direct insights into VP performance. (e.g., CPU usage, context switches, dispatch latencies, etc.). That is, because each VP is backed by a host thread, the host kernel can maintain the counters inside the host VM such as time spent in the hypervisor, time spent inside of its partition, time spent in the host kernel, etc.

In some embodiments, the VM guest operating systems and the host operating system might have the same kernel; i.e., each might have an instance of the same basic operating system kernel, albeit within different VMs and for different purposes. In such a case, enlightenments can allow for better integration of lightweight VM containers that can host applications. This technique provides improved isolation and sandboxing of applications (i.e., better security but with acceptable performance). As noted above, other guest enlightenments might be supported. For example, a guest might invoke a hypercall to share information about its workload, processing priorities or characteristics, etc. The host operating system may take this into account when making scheduling decisions.

Figure 8:
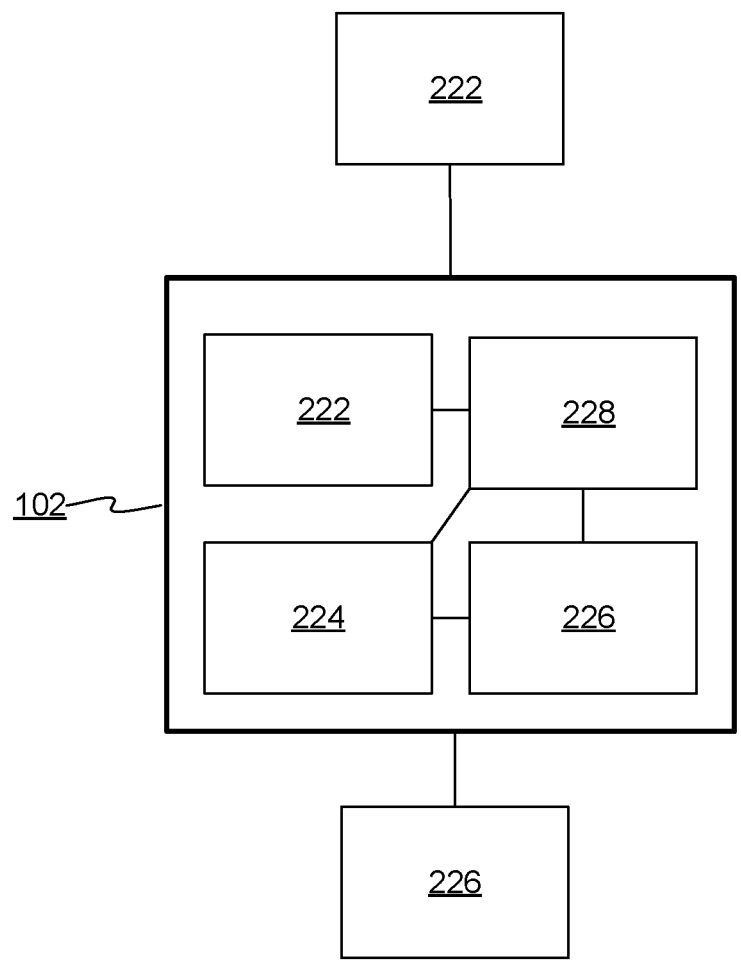
FIG. 8 shows details of a computing device.

FIG. 8 shows details of the computing device 102 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 220 to implement any of the features or embodiments described herein.

The computing device 102 may have one or more displays 222, a network interface 224 (or several), as well as storage hardware 226 and processing hardware 228, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 226 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 102 may cooperate in ways well understood in the art of machine computing. In addition, input devices may be integrated with or in communication with the computing device 102. The computing device 102 may have any form-factor or may be used in any type of encompassing device. The computing device 102 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 228. The stored information can be in the form of machine executable instructions (e.g., compiled executable binary code), source code, byte-code, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device comprising a central processing unit (CPU) comprising physical processors (PPs), the method comprising:
executing a hypervisor comprising a first kernel, and executing an operating system comprising a second kernel, wherein the operating system and the second kernel execute in a first virtual machine (VM) comprising a corresponding first VP;
managing, by the first kernel, second VMs comprising respective second virtual processors (VPs), the managing comprising maintaining physical processor states of the respective second VPs and swapping the physical processor states into, and out of, the PPs that correspond to the second VPs, the physical processor states comprising respective sets of register values, wherein the second VPs do not include the first VP; and
scheduling the second VPs to execute on the PPs that correspond to the second VPs, wherein decisions to schedule the second VPs for execution are made by the first VP executing the second kernel in the first VM, wherein the scheduling by the second kernel comprises:
determining, by the second kernel, to execute a specific VP of the second VPs,
identifying, by the second kernel, to the hypervisor, the specific VP of the second VPs to execute, and based on the identifying the hypervisor performs a processor context switch on a PP corresponding to the specific VP, the processor context switch performed using the physical processor state corresponding to the specific VP.

2. A method according to claim 1, wherein the first kernel implements a hypercall, wherein when the second kernel determines to execute the specific VP, and wherein the second kernel invokes the hypercall to identify the specific VP to the first kernel.

3. A method according to claim 2, wherein the first kernel maintains the physical processor states for the respective second VPs, wherein the hypercall is invoked with an identifier of the specific VP, and based thereon the first kernel performs the processor context switch.

4. A method according to claim 1, wherein neither the hypervisor nor the first kernel schedule execution of the VPs.

5. A method according to claim 1, further comprising:
receiving a call from guest code executing in a second VM having a second VP scheduled by the second kernel; and
scheduling, by the second kernel, processing time for the second VP of the second VM or another second VM based on the call from the guest code.

6. A method according to claim 1, wherein a second VM executes with lower privilege than the second kernel, and wherein the second kernel executes with lower privilege than the first kernel.

7. A method according to claim 1, wherein a second VM, the first kernel, and the second kernel operate in respective different trust domains.

8. A computing device comprising:
a central processing unit (CPU) comprising physical processors (PPs);
storage hardware storing a hypervisor comprising a hypervisor kernel and a guest operating system (OS) comprising a guest OS kernel, the guest OS kernel configured to run in a first virtual machine (VM) executed by a corresponding first virtual processor (VP) executing on a PP;
the hypervisor kernel configured to maintain representations of respective second virtual processors (VPs) for second VMs that do not include the first VM, wherein the first VP is not one of the second VPs;
the guest OS kernel configured to (i) make scheduling decisions for scheduling execution of the second VPs and to (ii) identify a specific VP of the second VPs to the hypervisor kernel when the guest OS kernel decides to schedule the second BP, wherein operations to implement the scheduling decisions are performed by the hypervisor kernel; and
the hypervisor kernel further configured to, based on the guest OS kernel identifying the specific VP to the hypervisor kernel, select a set of register values corresponding to the identified VP and swap the set of register values into a PP corresponding to the identified specific VP to begin executing the identified specific VP on the corresponding PP.

9. A computing device according to claim 8, wherein the guest OS kernel is configured to run within the first VM, wherein the representations comprise respective threads of the guest OS kernel.

10. A computing device according to claim 8, wherein the guest OS kernel is configured to control, when it schedules VPs, which which PPs the hypervisor will use to execute the VPs, and wherein the hypervisor kernel is configured to, each time the guest OS kernel issues a call to execute a given VP, execute the given VP a corresponding PP.

11. A computing device according to claim 8, wherein the hypervisor kernel is configured to handle an interrupt of execution of a VP executing on a PP by returning corresponding control to the guest OS kernel.

12. A computing device according to claim 8, wherein the hypervisor kernel is not configured to schedule execution of the VPs on the PPs.

13. A computing device according to claim 8, wherein the quest OS kernel provides VP scheduling information to the hypervisor kernel through a shared memory portion that is directly accessible by the hypervisor kernel and the quest OS kernel.

14. Computer storage hardware storing information configured to, when executed by processing hardware of a computing device, cause the computing device to perform a process, the process comprising:

executing a virtualization operating system that performs virtualization services for first virtual machines (VMs) executing on the computing device, the virtualization services including virtualizing access to hardware of the computing device for the first VMs, the virtualization operating system determining when the first VMs will have execution time on a central processing unit (CPU) of the computing device, the CPU comprising physical processors (PPs), the virtualization operating system executing in a privileged VM which is not one of the first VMs, wherein when the virtualization operating system determines that a specific first VM is to have execution time, the privileged VM identifies the specific first VM to a hypervisor kernel; and
executing the hypervisor kernel on the CPU, the hypervisor kernel executing the privileged VM and the first VMs on the PPs of the CPU, wherein, based on the identifying of the specific first VM by the privileged VM, the hypervisor kernel executes the identified specific first VM by selecting a corresponding execution context comprising register values, and by swapping the register values into a PP to enable the specific first VM to begin executing on the PP.

15. Computer storage hardware according to claim 14, wherein the privileged VM executes in a security domain separate from a security domain of the hypervisor kernel.

16. Computer storage hardware according to claim 14, wherein the privileged VM communicates with the hypervisor kernel to instruct the hypervisor kernel to execute a specific VP of the specific first VM.

17. Computer storage hardware according to claim 14, the process further comprising: managing, by the virtualization operating system, VP dispatch threads that back VPs of the first VMs.

18. Computer storage hardware according to claim 17, further comprising: when a VP dispatch thread is executing on a PP, responding to an interrupt on the PP executing the VP dispatch thread by returning control from the VP dispatch thread to the virtualization operating system.

19. Computer storage hardware according to claim 14, further comprising maintaining, by the processor, execution contexts for respective virtual processors (VPs), and swapping the execution contexts in and out of the PPs responsive to instructions from the virtualization operating system.

20. A method according to claim 1, further comprising:
maintaining a mapping between identifiers of the VPs and the respective physical processor states; and
accessing the physical processor state corresponding to the identified specific VP by referencing the identified specific VP in the mapping.

* * * * *